July 23, 1957 L. A. FREEMAN 2,800,306
AIR CONDITIONING SYSTEM
Filed Feb. 16, 1954
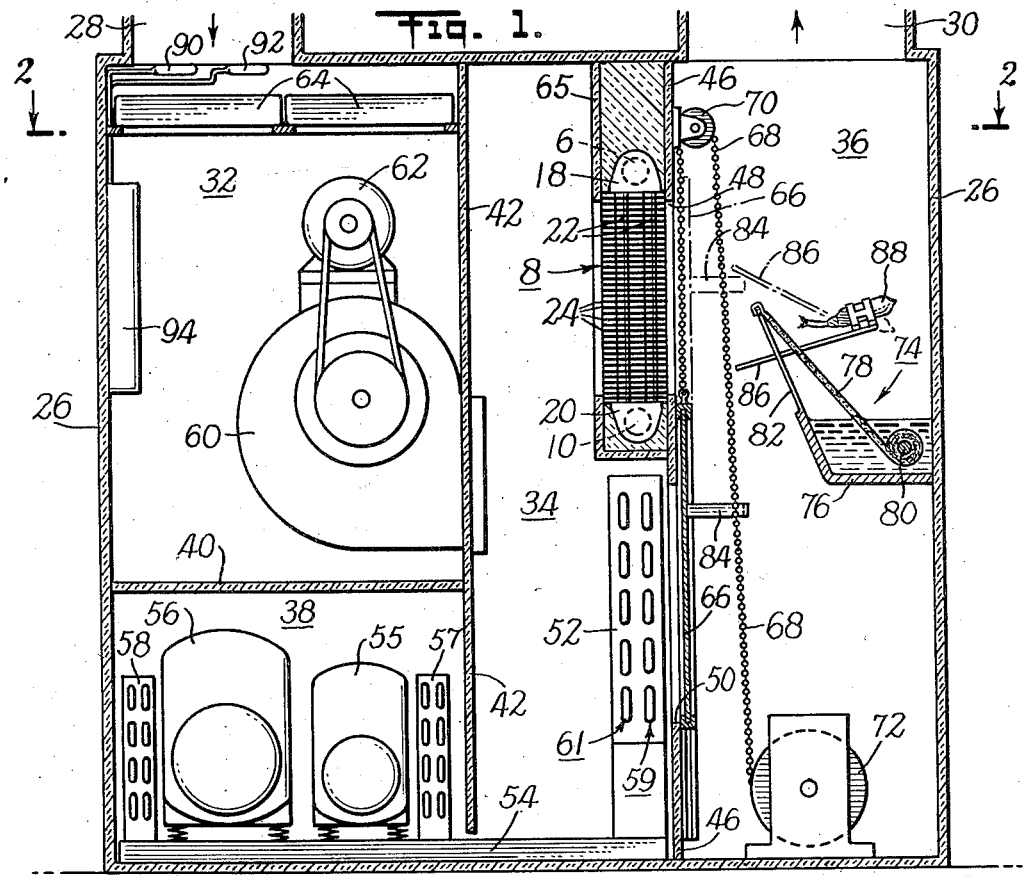
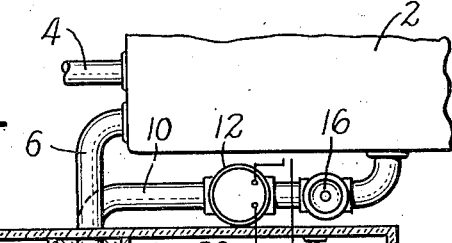
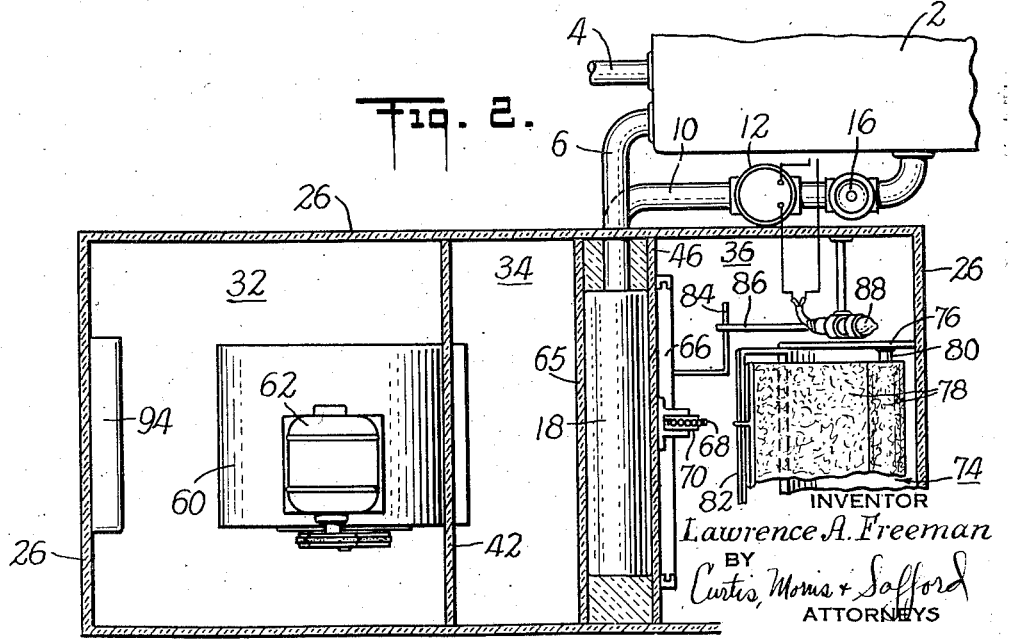
INVENTOR
Lawrence A. Freeman
BY
Curtis, Morris + Safford
ATTORNEYS United States Patent Office 2,800,306
Patented July 23, 1957

2,800,306

AIR CONDITIONING SYSTEM

Lawrence A. Freeman, Flushing, N. Y., assignor to Capco Products Co., Inc., Flushing, N. Y.

Application February 16, 1954, Serial No. 410,490

4 Claims. (Cl. 257—3)

This invention relates to year-round air conditioning, and more in particular to a system for supplying hot or cold air at controlled temperatures to a conditioned space such as a home, and also for supplying hot water for use therein.

Systems have been provided for heating homes with a central heating plant, and systems have also been provided for heating or cooling a home as required by the outside temperature conditions. There has been a tendency for such systems to be more or less bulky, and they have often been quite complicated when they are fully automatic in operation. It is an object of the present invention to provide an improved system for heating and cooling a space, such as a home, and to provide fully automatic operation. It is a further object to provide a compact and efficient central unit which heats and cools a conditioned space in accordance with the demand. It is a further object to provide a central system of the above character which heats and cools a home as desired, and which also is a source of hot water. It is a further object to provide a heating and cooling unit which may be fully automatic if desired, and which is efficient and dependable in operation at all times. It is a further object to provide for the above with structure which is sturdy and compact, and light in weight. It is a further object to provide for the above with equipment which is inexpensive to install and maintain, and which is readily serviced. These and other objects will be in part obvious and in part pointed out below.

In the drawings:

Figure 1 is a vertical section of a heating and cooling unit of a system which constitutes one embodiment of the invention; and, Figure 2 is a horizontal section on the line 2—2 of Figure 1 with certain elements of the system represented schematically.

The illustrative embodiment of the invention is a system for heating and cooling a relatively small home, and also for providing hot water to the occupants of the home. Referring to Figure 2 of the drawing, a full-fired boiler 2 is represented schematically. Within the boiler is a water-heating coil 4 which is connected to a supply of water such as a city main, and constitutes a source of hot water at a pipe 4 for use in the home. Hot water is also supplied through a pipe 6 to a heating coil 8, and the water returns from coil 8 to boiler 2 through a pipe 10. The water is circulated by a pump 12 in pipe 10 and driven by an electric motor. Pipe 10 has a valve 16 therein which is closed to prevent circulation of water when desirable. Pump 12 is of the centrifugal type which permits water to flow due to thermostatic action when the pump is not operating. Boiler 2 has controls to maintain a predetermined water temperature.

Referring now to Figure 1 of the drawings, coil 8 is of the water-tube and header type, with its water inlet header 18 at the top, its water outlet header 20 at the bottom, and interconnecting water tubes 22 which carry horizontal fins 24. Coil 8 is mounted within a rectangular cabinet or casing 26 which has at the left an air inlet conduit 28, and at the right an air outlet conduit 30. Casing 26 is divided into four compartments there being, an air inlet compartment 32 to which air passes from the inlet conduit 28; a central air chamber 34; a plenum chamber 36 from which the air passes through the outlet conduit 30; and, an equipment chamber 38 which is beneath chamber 32, and is separated therefrom by a partition 40. Chamber 34 is separated from chamber 32 and 38 by a partition 42. Chamber 34 is separated from chamber 36 by a partition 46 which has an opening 48 coincident with heating coil 8, and beneath this there is a similar opening 50 which is coincident with a cooling coil in the form of a refrigerant evaporator 52. The outside walls of casing 36 and the dividing partitions 40, 42, and 46 are all heat insulated with reflective linings formed by aluminum foil.

Evaporator 52 is a portion of a refrigeration system having the remainder of its elements in compartment 38. This entire system is mounted upon a removable base plate or frame 54 which extends beneath partition 42, and which is slideable so that the entire system may be removable for servicing by merely opening the side of the cabinet. This refrigeration system comprises two separate refrigeration units: one is formed by a motor compressor 56, condenser 58, and an evaporator section 61 which is part of evaporator 52; and, the other unit is formed by a motor compressor 55, a condenser 57, and an evaporator section 59 which is the other part of evaporator 52. These two refrigeration units are operated simultaneously under normal or heavy load conditions, but only one unit is operated when the load is light. The air passes through evaporator sections 61 and 59 in series so that all of the air is cooled some, even though only one unit is operating.

Positioned within the compartment 32 is a blower 60 which is driven by a motor 62. Extending across the top of compartment 32 are filters 64 which filter the air from conduit 28 and may be slid out and replaced. Mounted within chamber 34 is the heating coil 8 referred to above, which is supported between partition 46 and a supporting frame 65.

Positioned within compartment 36 upon partition 46 is a vertically slidable square damper 66 which rides between guides and is suspended from the center of its top frame by a chain 68. Chain 68 extends over a pulley 70 mounted on partition 46, and extends downwardly to a winding reel 72 which is motor driven, and which is adapted to raise the damper by winding up the chain. The damper moves between its lower position shown, wherein it closes opening 50, and a fully-raised position indicated in broken lines, wherein it closes opening 48.

Damper 66 carries a switch-operating bracket 84 which is adapted to engage an operating arm 86 of a mercury switch 88 when the damper approaches its elevated position. Switch 88 is gravity urged to its closed position shown, but it is opened by the raising of its arm 86. Referring to Figure 2, switch 88 is connected in series with the motor of pump 12 so that the opening of the switch stops the water-circulating motor. In practice, the water-circulating motor is stopped when the damper reaches a position where it covers substantially three-quarters of opening 48. It has been found that thermosyphonic action causes sufficient circulation of water through coil 8 for minimum heating requirements, and the stopping of the pump permits more accurate heat control.

During summer operation, i. e., for cooling the air, damper 66 is held in its fully elevated position, and all of the air which passes to chamber 34 flows through evaporator 52 and is cooled. This air passes upwardly, and is circulated through the conditioned space. The return air and the fresh air are admitted together through the inlet conduit 28, and the bulb 90 of a thermostat control is positioned in the inlet conduit 28, and controls the starting and stopping of the motor compressors 56 and 55 of the refrigeration units. In practice, one of these units is started when the temperature at 90 rises above a predetermined value and, upon a further rise in temperature, the other unit is started. Water coil 8 has vertical water tubes and horizontal fins 24 as indicated above, whereas evaporator 52 has horizontal refrigerant tubes and vertical fins. There are substantially one-third more fins on the evaporator than on the water coil so as to give a proper heat transfer balance between the heating and cooling operations.

The air which is drawn in by fan 60 through conduit 28 and is blown into chamber 34 may pass through either coil 8 or evaporator 52, depending upon the position of damper 66. When the damper is in an intermediate position, air passes through the upper portion of coil 8 and the lower portion of the evaporator. The air flowing in this manner then passes upwardly through chamber 36 and out through conduit 30.

Mounted upon the right-hand wall of casing 26 is a humidifying unit 74 formed by an open-top tank or trough 76 and a wick 78 which draws water from the tank. Wick 78 is coiled on a spring operated roller 80, but may be drawn out to the position shown and hooked upon a bracket 82 extending from the side of the tank. Thus, when air humidification is desirable, tank 76 is filled with water by an automatic float valve (not shown), and wick 78 is extended to the position shown. However, when no humidification is needed, the wick is released, and is wound automatically onto roller 80.

During winter operation, i. e., when heating is required, the refrigeration system is stopped automatically by the drop in the temperature of the air contacting bulb 90. A heat control bulb 92 senses the temperature of the air entering through conduit 28, and causes the operating mechanism to turn reel 72. A rise in the temperature of bulb 92 causes reel 72 to wind up an increment of chain 68, and a fall in the temperature of bulb 92 causes the reel to unwind an increment of the chain. Hence, as the air passing into casing 26 rises, a smaller amount of air flows through water coil 8; and, as this air flow is reduced a corresponding portion of the evaporator opening 52 is uncovered by the raising of the damper, and the air is diverted therethrough. Hence, a constant volume of air passes through the two openings.

The air which is heated by passing through coil 8 mixes in chamber 36 with the unheated air passing through opening 50, so as to provide a stream of air of modulated temperature which passes out through conduit 30. Successive rises in the temperature of bulb 92 cause damper 66 to be moved toward its fully elevated position so that increasing amounts of the air pass through opening 50. Damper 66 is positioned close to the adjacent edges of fins 24 so as to close the horizontal passageways between the fins of the unexposed or covered portion of coil 8. Hence, the damper is quite effective in reducing the heating effect without any change in the water temperature in the coil. However, the vertical fins on the evaporator 52 permit air to flow through them with more freedom at all times because the restriction is only at the damper side of the evaporator. In other words, the air which is diverted downwardly may enter between the fins and flow downwardly to the restricted outlet.

In this embodiment of the invention, a control box 94 is mounted in the side panel of casing 36, and encloses the manual control switch and the other control units which are not mounted with the mechanisms which they control. The control equipment includes a starter which is effective to start the blower immediately, and which then starts the two compressors in series if cooling is called for. Motor 62 which operates a blower or fan 60 is a two-speed motor which operates at lower speed when the system is heating the air. The motor then operates at high speed when the system is cooling the air, and this insures satisfactory operation even under extreme load conditions. Under some circumstances, damper 66 may be moved manually. Also, valve 16 may be operated manually, or it may be closed automatically whenever the refrigeration system is operated.

In the illustrative embodiment, motor compressor 55 is of one-ton rated capacity, and motor compressor 56 is of two-ton rated capacity. Hence, for very light cooling loads, only motor compressor 55 is operated, and at intermediate cooling loads only motor compressor 56 is operated. At heavy loads, both motor compressors are operated. This gives versatility and economic operation, and permits accurate temperature control.

During heating operation the system circulates a constant volume of air, and the temperature of the air is modulated by the automatic positioning of damper 66. That is, the damper is positioned so that a certain portion of the air is passed through the heating coil and the remainder is diverted around the heating coil. This air then mixes thoroughly in chamber 36 and passes to the conditioned space. This constant volume of air is given a modulated temperature which insures the proper temperature in the space. If the thermostat control is not satisfied, damper 66 is moved one increment to a new position. For example, if the temperature has fallen below the optimum value, a larger portion of the air passes through the heating coil and a correspondingly lesser amount is diverted. This causes a rise in the temperature of the air passing to the conditioned space, and the drop in the temperature is therefore corrected. However, if the drop in temperature is not corrected, that is, if the control equipment still indicates that the temperature is too low after sixty seconds, the damper is lowered another increment. This causes a further increase in the air temperature. In other words, the damper is lowered two increments at the end of each sixty seconds as long as the temperature of the conditioned space is below the optimum value. Conversely, the damper is raised one increment at the end of each sixty seconds as long as the temperature of the conditioned space is below the optimum value. The control equipment permits an adjustment of the time delay between the successive increment movements of the damper when, for example, the complete air circuit through the conditioned space is greater and the sixty-second interval would cause "hunting."

This system is extremely simple, and may be self-contained as has been indicated above. Under some circumstances, manual and automatic controls may be positioned remote from the unit. For example, a manual off-and-on switch may be provided at a remote point, and a modulated thermostat control may be provided from the conditioned space.

I claim:

1. A unit air conditioner comprising an enclosing casing having vertical partitions forming an air inlet chamber, an intermediate plenum chamber and an air outlet chamber, a blower in the air inlet chamber for delivering air through the first partition to the next adjacent plenum chamber, said second vertical partition between the intermediate plenum chamber and the air outlet chamber having adjacent openings therein located one above the other, a heating coil having horizontal heat transfer fins overlying the upper opening, a hot water heater connected to the heating coil, a pump for circulating hot water from the heater through the heating coil, an evaporator coil having vertical heat transfer fins and overlying the lower opening in the partition wall, refrigeration apparatus in the air inlet chamber connected to deliver refrigerant to the evaporator, a vertically arranged damper mounted to slide vertically to cover the heating coil in its upper position, cover the cooling coil in its lower position and cover inversely proportional areas of the separate coils at any intermediate position to at all times pass substantially the same volume of air through the partition, and control means for the hot water circulating pump and refrigeration apparatus.

2. A unit air conditioner in accordance with claim 1 in which the control means for supplying a heating medium includes an electric switch for controlling operation of the pump, and means on the damper for operating the electric switch to stop the pump when the damper approaches a position to close the opening over which the heating coil is mounted.

3. A unit air conditioner in accordance with claim 1 in which the control means includes a thermostat responsive to a condition affected by the cooling coil for varying the capacity of the refrigeration apparatus, and means for sliding said damper plate to vary the proportions of the constant volume of air flowing through the cooling coil and heating coil, respectively.

4. A unit air conditioner comprising, an enclosing casing having a vertical partition dividing the casing into separate chambers, said partition having adjacent openings therein, separate vertically arranged coils overlying the openings in the partition, a blower for delivering air to one side of the partition, a vertically arranged damper plate mounted to slide to open inversely proportional areas of the separate openings at any intermediate position and completely close either opening at opposite ends of its movement, said openings, damper and coil resistance being correlated to pass substantially the same volume of air from said one side to the other of the partition at any position of the damper, means for supplying a cooling medium to one of the coils, means for supplying a heating medium to the other coil whereby the air may be either heated or cooled in varying degree by adjusting the position of the damper, and means for controlling the flow of heating and cooling medium to the respective coils including an electric switch to stop the flow of medium to one of the coils, and means on the damper for operating the switch to stop the supply of medium to its coil when the damper approaches a position to close the opening over which said coil is mounted.

References Cited in the file of this patent

UNITED STATES PATENTS

| | | |
|---|---|---|
| 1,782,209 | Mauck | Nov. 18, 1930 |
| 2,238,688 | Guler | Apr. 15, 1941 |
| 2,254,185 | Newton | Aug. 6, 1941 |
| 2,401,890 | Smith et al. | June 11, 1946 |